May 27, 1930.  F. P. WHITAKER  1,760,533
VAPOR DISCHARGE DEVICE
Filed Feb. 5, 1929

Inventor:
Frank P. Whitaker,
by Charles E. Tullar
His Attorney.

Patented May 27, 1930

1,760,533

UNITED STATES PATENT OFFICE

FRANK P. WHITAKER, OF RUGBY, ENGLAND, ASSIGNOR TO GENERAL ELECTRIC COMPANY, A CORPORATION OF NEW YORK

VAPOR DISCHARGE DEVICE

Application filed February 5, 1929, Serial No. 337,662, and in Great Britain February 14, 1928.

My invention relates to vapor electric devices such as mercury arc rectifiers, and its principal object is to provide an improved method of regulating or compounding the D. C. voltage produced by the rectifier.

Various systems of connections for such rectifiers are known in which reactance coils or transformers are introduced into the circuits in which the anode currents flow, in such a way as to increase the self inductance or mutual inductance between the circuits to the different anodes of the rectifier. It is known that the introduction of such self or mutual inductance into the anode circuits modifies the anode current wave form and thereby changes the direct current voltage produced.

It has been proposed to regulate the D. C. voltage at will by putting these inductance coils or transformers partially out of action by saturating their cores with direct current flux, which is in some cases produced in them by special D. C. windings.

In the improved method of voltage regulation, according to my invention, these reactance coils or transformers are partially put out of action as desired by mechanical means. In one form the cores of them are provided with a movable part by means of which an air gap of adjustable length or cross section may be introduced into the magnetic circuit. Alternatively the effect of a variable air gap may be produced by introducing in series with the magnetic circuit an armature with a short circuited coil on one axis. In another form a stator and rotor are coupled in series so that by rotation the rotor magnetization will either help or oppose the stator magnetization.

The manner in which this partial putting out of action of such coils produces a variation of the D. C. voltage is already known in connection with other methods of putting such coils out of action; and therefore need not be explained.

Figure 1:
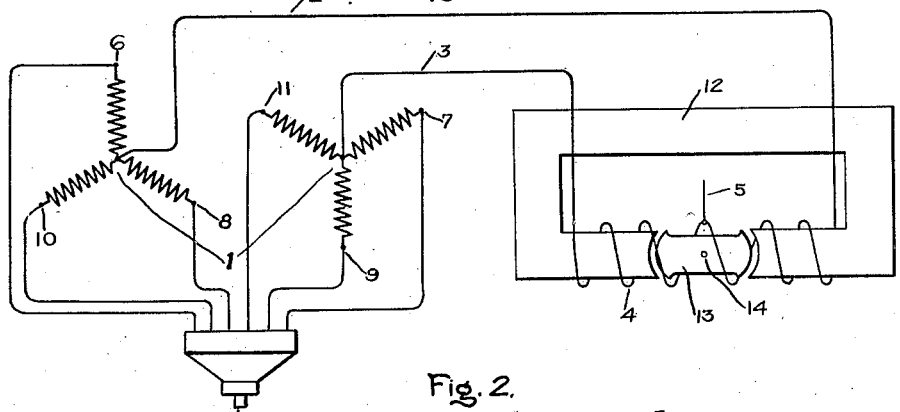
Figure 2:
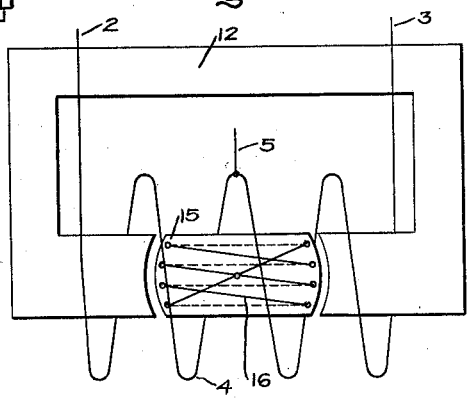
Figure 3:
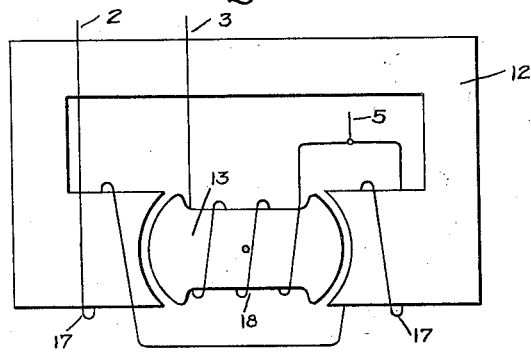

In the accompanying drawings, Figs. 1, 2 and 3 represent diagrammatically three alternative forms of the invention.

In Fig. 1 the known connection which has been chosen for illustrating the invention is that in which a 6-phase, star-connected secondary winding of the main transformer 1 is divided up into two 3-phase, star-connected groups, whose neutral points 2 and 3 are connected together through an interphase transformer 4, whose neutral point 5 forms the negative pole of the D. C. system supplied by the rectifier. 6, 7, 8, 9, 10 and 11 are the transformer terminals for connection to the anodes of the rectifier. The interphase transformer winding 4 is wound on a magnetic core 12 of which a part 13 is movable. In the example shown, 13 is capable of rotation on an axis 14, so that by rotating it the reluctance of the magnetic circuit can be changed. In the position shown, the reluctance of the magnetic circuit is at its minimum value. By moving 13 to the position of maximum reluctance it is possible, with suitable design, to obtain an increased D. C. voltage.

Any form of magnetic circuit in which the reluctance could be changed over a wide range by moving part of the core so as to vary the length or cross section of an air gap in the core could alternatively be used.

Alternatively, the flow of the flux in the magnetic core could be largely prevented by introducing a movable short circuited winding by which the flux in the core could be damped out. One example of this is illustrated in Fig. 2.

In Fig. 2 the same transformer connection has been chosen for illustrating the construction as in Fig. 1, and therefore only the interphase transformer 4 is illustrated. In this case the rotatable armature 15 carries a short circuited winding 16 on one axis. Consequently, in the position shown the reluctance of the magnetic circuit will be low, whereas if 15 is turned through 90 degrees the short circuited winding 16 will practically damp out the flux and thus give the effect of a high reluctance.

In the alternative construction in Fig. 3, the interphase transformer winding corresponding to 4 in Fig. 1 is in two equal parts, connected in series; namely, a stationary part 17 and a rotatable part 18 carried on the rotatable part 13 of the core. The neutral point 5 forming the negative pole of the D. C. system is at the junction point of the two parts of the winding. By rotating 13 and with it 18 the two halves of the winding can be made either to help or oppose one another and thus give the effect of a high or a low reluctance respectively. The construction shown in Fig. 3 is of course only diagrammatic.

In any of the forms of the invention the movable parts by moving which the change of reluctance is produced, could be controlled by hand or automatically in any convenient way. For instance, they may be controlled by a voltage relay so as to cause them to adjust the D. C. voltage of the rectifier automatically to a constant value or to a value increasing with the load.

It has been explained that the method of voltage control according to the invention may be applied to any of the arrangements known in which reactance coils or transformers are introduced into the circuits in which the anode currents flow, so as to modify the self or mutual inductance of the anode circuits. Thus the invention is not limited to interphase transformers nor to the particular transformer connections illustrated in the diagrams; but it may be applied also to any of the forms of coils which have been proposed or used for variation of the D. C. voltage in which the magnetizing reactance of the coils heretofore has been varied by direct current excitation to saturate the core.

What I claim as new and desire to secure by Letters Patent of the United States, is:

1. The combination of direct and alternating current circuits, an electric discharge device connected to said alternating current circuit, and an interphase transformer including coils connected between said alternating current circuit and said device, and a core provided with an air gap and with an adjustable member arranged to vary the length of said air gap.

2. The combination of direct and alternating current circuits, an electric discharge device connected to said alternating current circuit, and an interphase transformer including coils connected between said alternating current circuit and said device, a core arranged to support said coils and provided with a rotatable member, and a winding mounted on said member and inductively related to said coils.

3. The combination of direct and alternating current circuits, an electric discharge device connected to said alternating current circuit, and an interphase transformer including coils connected between said alternating current circuit and said device, a core provided with a movable member, and a short-circuited winding mounted thereon and arranged in inductive relation to said coils.

In witness whereof, I have hereunto set my hand this 15th day of January, 1929.

FRANK P. WHITAKER.